(12) United States Patent
Bressler et al.

(10) Patent No.: US 12,459,106 B2
(45) Date of Patent: Nov. 4, 2025

(54) AUTONOMOUS RAIL AND TREAD SELF-DRIVING AND ANCHORING ASSEMBLY

(71) Applicant: Southwest Research Institute, San Antonio, TX (US)

(72) Inventors: Cody Bressler, San Antonio, TX (US); Meera M. Towler, San Antonio, TX (US)

(73) Assignee: Southwest Research Institute, San Antonio, TX (US)

( * ) Notice: Subject to any disclaimer, the term of this patent is extended or adjusted under 35 U.S.C. 154(b) by 1071 days.

(21) Appl. No.: 17/490,597

(22) Filed: Sep. 30, 2021

(65) Prior Publication Data
US 2023/0098603 A1   Mar. 30, 2023

(51) Int. Cl.
| | | |
|---|---|---|
| *B25J 5/00* | (2006.01) | |
| *B25J 5/04* | (2006.01) | |
| *B25J 11/00* | (2006.01) | |
| *B60L 15/40* | (2006.01) | |
| *B61B 13/10* | (2006.01) | |
| *B61B 13/12* | (2006.01) | |
| *B62D 21/14* | (2006.01) | |
| *B62D 55/075* | (2006.01) | |
| *B62D 57/024* | (2006.01) | |
| *B25J 19/02* | (2006.01) | |

(52) U.S. Cl.
CPC ............... *B25J 5/005* (2013.01); *B25J 5/04* (2013.01); *B25J 11/00* (2013.01); *B25J 11/005* (2013.01); *B60L 15/40* (2013.01); *B61B 13/10* (2013.01); *B61B 13/12* (2013.01); *B62D 21/14* (2013.01); *B62D 55/075* (2013.01); *B62D 57/024* (2013.01); *B25J 19/02* (2013.01)

(58) Field of Classification Search
CPC ... B25J 5/005; B25J 5/04; B25J 11/005; B25J 11/00; B25J 19/02; B60L 15/40; B62D 21/14; B62D 57/024; B62D 55/075; B61B 13/10; B61B 13/12
USPC .......................................... 104/138.2, 138.1
See application file for complete search history.

(56) References Cited

U.S. PATENT DOCUMENTS

| | | | | |
|---|---|---|---|---|
| 4,909,341 | A * | 3/1990 | Rippingale | B62D 55/07 180/9.1 |
| 5,017,084 | A | 5/1991 | Lemelson | |
| 5,363,935 | A * | 11/1994 | Schempf | B62D 55/265 901/44 |
| 8,170,715 | B1 * | 5/2012 | Vallapuzha | F16L 55/265 138/97 |

(Continued)

FOREIGN PATENT DOCUMENTS

| | | | | |
|---|---|---|---|---|
| CN | 109159828 | A * | 1/2019 | B25J 11/00 |
| CN | 112008737 | A * | 12/2020 | B25J 11/00 |

(Continued)

*Primary Examiner* — S. Joseph Morano
*Assistant Examiner* — James William Jones
(74) *Attorney, Agent, or Firm* — Patterson + Sheridan, LLP; William Ryann

(57) ABSTRACT

An autonomous self-driving assembly for confined regions. The assembly is configured to move within and through narrow spaces as well as larger wider spaces. Once more, the assembly may support the carrying out of load-based applications even within the wider spaces. The assembly includes bracing capacity within such wide spaces to facilitate the carrying out of such load-based applications.

13 Claims, 5 Drawing Sheets

(56) References Cited

U.S. PATENT DOCUMENTS

| | | | |
|---|---|---|---|
| 8,317,555 B2* | 11/2012 | Jacobsen | B63C 11/52 |
| | | | 440/12.63 |
| 8,393,422 B1* | 3/2013 | Pensel | B62D 55/07 |
| | | | 180/9.46 |
| 8,935,014 B2* | 1/2015 | Jacobsen | F42B 12/365 |
| | | | 701/2 |
| 9,031,698 B2* | 5/2015 | Smith | B62D 55/06 |
| | | | 700/262 |
| 9,383,055 B2* | 7/2016 | Hirose | F16L 55/40 |
| 9,586,636 B1* | 3/2017 | Burmeister | B62D 53/028 |
| 9,616,948 B2* | 4/2017 | Ben-Tzvi | B62D 55/02 |
| 9,784,599 B1* | 10/2017 | Close | F16L 55/30 |
| 9,791,090 B2* | 10/2017 | Hirose | B61B 13/10 |
| 2017/0028520 A1* | 2/2017 | Jesu Plu | B64F 5/10 |
| 2018/0154954 A1* | 6/2018 | Bagheri | B62D 55/14 |
| 2021/0114219 A1* | 4/2021 | Keravala | B25J 9/0084 |
| 2023/0019349 A1* | 1/2023 | Brown | B25J 19/0025 |

FOREIGN PATENT DOCUMENTS

| | | | | |
|---|---|---|---|---|
| KR | 20200098371 A | * | 8/2020 | |
| WO | WO-2021034630 A1 | * | 2/2021 | B25J 19/02 |

* cited by examiner

AUTONOMOUS RAIL AND TREAD SELF-DRIVING AND ANCHORING ASSEMBLY

BACKGROUND

Over the years, industrial applications ranging from servicing wells, exploring natural underground formations and caves, or even inspection of large man-made structures are increasingly performed by autonomous assemblies. For example, in the circumstance of well servicing, a tractor-like assembly may be used to advance imaging or interventional equipment into a well for inspection or for performing a more invasive application at a predetermined location. This is understandable given that manually accessing a location, potentially several thousand feet away from the surface is not directly possible. Further, in many instances, simply dropping a vertical slickline cable or other type of conveyance line with application tools might be impractical. For example, the well may not remain vertical but rather take on a tortuous architecture or even become horizontal. Thus, traversing tortuous stretches or accessing horizontal legs is not possible without some sort of actively motive assembly. In other circumstances, things may be complicated by changing well diameter or the introduction of certain hardware obstructions.

While tractoring provides an example of an autonomous assembly effective for a consistently narrow passageway like a well, it is not an effective mode of conveyance when the passageway fails to remain of a fairly consistent profile. This is because tractoring involves the use of separate units that intermittently anchor to the well wall or casing and pull in an inchworm like fashion. However, this is only possible in a passageway such as a well where these expandable units may be sized in light of the well diameter. If the passageway is of an inconsistent or dramatically varying dimensions such as a room of a cave, ship hull or other facility with perhaps a connecting narrow passage, the ability to tractor ceases. This is because, once the tractor traverses the narrow passage of two feet in diameter, for example, and reaches a room of five feet or more in all directions, for example, the ability to anchor in the room is lost because the tractor arms are not able to simultaneously reach opposing walls of the room. Therefore, the ability to move is also lost.

The anchoring of a tractor in a well environment is advantageous even beyond serving as a mode of movement. Because the tractor utilizes anchoring, this means that an application of considerable force may be supported by the tractor. For example, with the tractor in a still position, with both units locked in an anchoring position, a tool delivered into the well with the tractor may be utilized. Even if the tool supports, drilling, milling, water jetting, cutting or any number of interventional applications involving substantial force, the anchored units are able to hold the tractor in place for the application. This ability to anchor and performing a high force application is again lost as soon as the tractor is outside of the narrow passageway environment where anchoring ability is lost.

Of course, other types of autonomous, self-driving assemblies are available which may be more practical for environments that vary extensively in dimension from one enclosed location to another. For example, autonomous snake-like assemblies have been developed that are capable of traversing narrow passages. These assemblies may use wheels or tracks. Once a snake assembly traverses a narrow passage, they may simply continue advancing through a larger room because there is no requirement of anchoring in order to achieve the continued advancement. Some of these "snakes" have even been developed that are able to climb stairs or otherwise continue advancement when presented with an intervening obstacle. That is, unlike a shorter autonomous wheeled or tracked assembly, an elongated snake form may have the ability to bend upward or attain different balanced angles to help facilitate advancement over such an obstacle.

Of course, whether or not the assembly is snake-like, it is not hard to envision a wheeled or tracked assembly navigating narrow passageways and large rooms alike. Unfortunately, where access to these enclosures is sought to perform an application of any sizable load or force, these assemblies fall short. That is, it may be possible to improve the grip or tread of these assemblies in relation to the surface over which they are driven. However, this is not the same thing as anchoring. If the assembly were to be utilized in performing an interventional application such as drilling a small hole in a surface or pressure washing it, the lack of anchoring may be an issue. Specifically, without the supportive anchoring, the instability of the assembly would likely make the application an impossible undertaking.

Presently, operators are left with the option of utilizing wheeled or tracked assemblies for passive applications such as imaging while more interventional applications that deliver force may only be carried out by tractoring assemblies. Unfortunately, tractoring assemblies are often impractical within non-uniform enclosures. Thus, these spaces are left unattended to where sizable interventional applications carried out by autonomous assemblies are sought.

SUMMARY

An autonomous, self-driving and anchoring assembly is disclosed. The assembly is of a gantry-type with a linear rail to accommodate a load-based application tool. First and second tread units are coupled to the rail to effect assembly advancement and to support movement of the assembly within a confined region. The confined region may include space within and outside of a narrow passageway. Once more, the units are configured for cooperatively stabilizing the assembly for a load-based application with the tool even when the assembly is positioned outside of the narrow passageway.

DETAILED DESCRIPTION

In the following description, numerous details are set forth to provide an understanding of the present disclosure.

However, it will be understood by those skilled in the art that the embodiments described may be practiced without these particular details. Further, numerous variations or modifications may be employed which remain contemplated by the embodiments as specifically described.

Embodiments are described with reference to confined regions of certain ship hull applications. For example, pressure washing applications that are supported by an autonomous rail and tread, self-driving and anchoring assembly are detailed. Of course, confined regions with wide and narrow spaces may include areas outside of ship hulls, such as liquid shipping or transport carriers, wind turbine blades, nuclear facilities, manmade facilities in war zones or even natural cavernous areas. Other environments may include industrial tanks such as those found in ship ballasts or the oil and gas industry. Further, boilers in power plants, complex regions inside aircraft fuselages or wings or flow systems inside power plants, refiners, processing facilities, and water or sewage treatment facilities.

Regardless, the example application is one in which the assembly is operated through narrow windows or passages reaching larger rooms or chambers where pressure washing is to be performed by an application tool. Of course, a variety of different applications involving some degree of force or load may take advantage of the concepts taught by the assembly. For example, media blasting, drilling, cleaning, painting, backfilling, or any number of load-based applications may be facilitated by such an assembly. Indeed, so long as the assembly is navigable through narrow passageways while also being capable of anchoring or bracing outside of a narrow passageway to support a load-based application, appreciable benefit may be realized.

Figure 1:
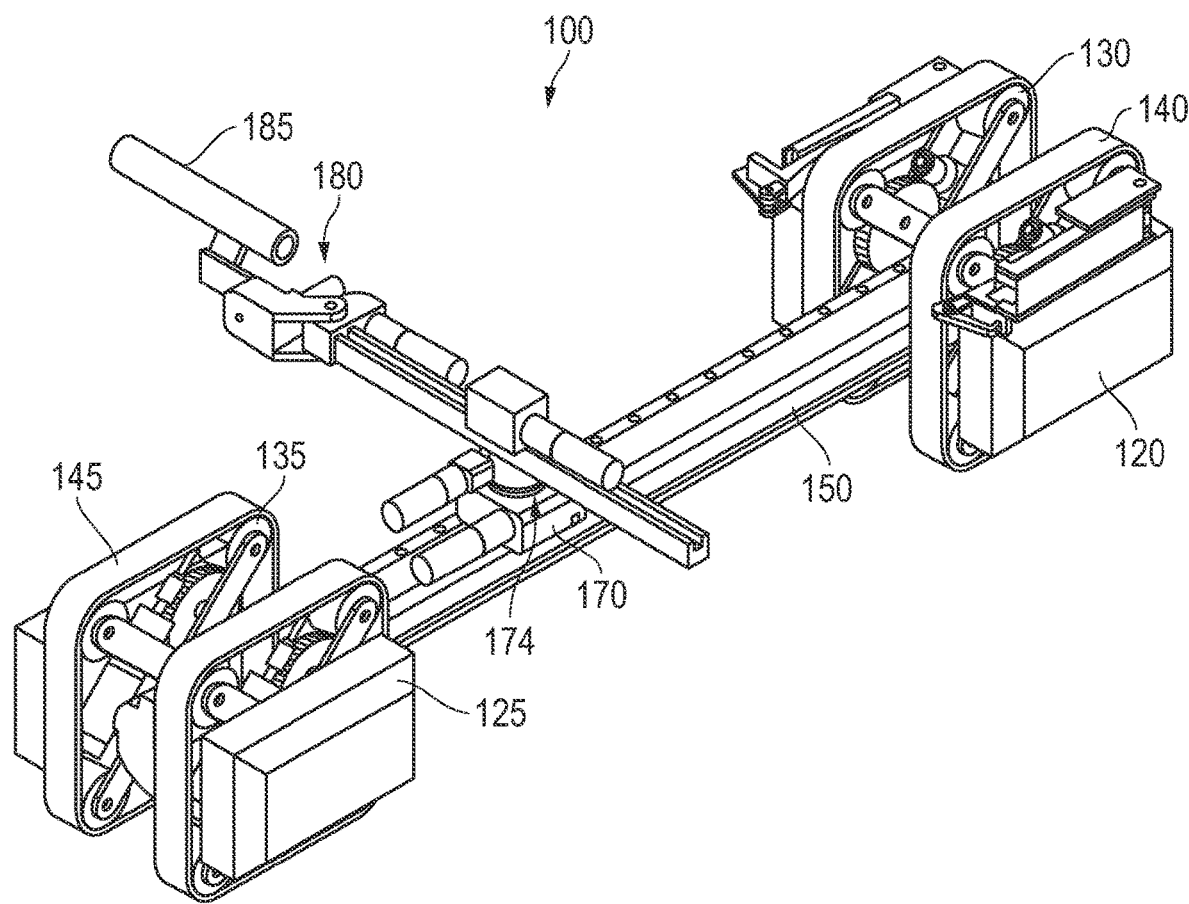
FIG. 1 is a perspective view of an embodiment of an autonomous rail and tread self-driving and anchoring assembly.

Referring now to FIG. 1, a perspective view of an embodiment of an autonomous rail and tread, self-driving and anchoring assembly 100 is shown. The assembly 100 is an advanced mobility crawler that includes tread units 120, 125 with a linear rail 150 running therebetween. The result is a gantry-like appearance with the rail 150 used to accommodate an application tool 180. In the embodiment shown, the tool 180 is made up of an arm outfitted with a spray device 185 to direct a pressure washing application. However, as discussed below, the tool 180 may be any number of different devices configured for directing an application with the potential to involve some measure of load or force (for example, in excess of 10 lbs. of force).

In the embodiment of FIG. 1, the tool 180 is shown roughly at a perpendicular orientation relative the rail 150. However, notice that this may be due to a pivot mechanism 174 which allows the tool 180 to take on a desired orientation for the application at hand as detailed below. Indeed, the pivot 174 and the entire tool 180 are supported by a slidable base 170. Thus, the tool 180 may be oriented as desired relative the rail 150 and moved along the rail 150 without requirement of moving the entire assembly 100. This may be advantageous in circumstances where the assembly 100 is immobile and braced for the performance of an application as described further below.

As illustrated, the tread units 120, 125 include treads 140, 145 that are directed by conventional rollers 130, 135 located interior to the treads 140, 145. The units 120, 125 are fairly compact, perhaps less than two feet wide from one side to the other. Similarly, the height of the assembly, including the tool 180 may be less than about a foot. Thus, the profile of the entire assembly 100 may be kept to a minimum. For example, the assembly 100 may be of a profile sufficiently small enough to advance through a passageway 225 as illustrated in FIG. 2A.

Figure 2A:
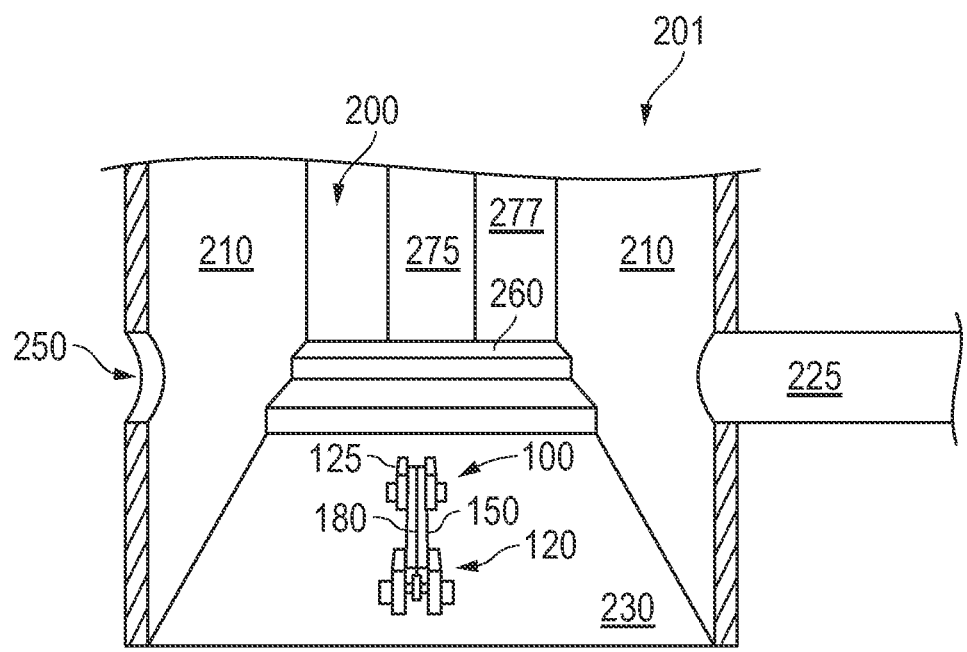
FIG. 2A is a perspective view of the assembly of FIG. 1 within a confined region having both narrow and wide spaces.

Referring now to FIG. 2A, a perspective view of the assembly 100 of FIG. 1 is illustrated within a confined region 201 presenting both narrow spaces (e.g. 225, 250) and wide spaces (e.g. 200). Historically, these types of areas 201 present a unique challenge to applications that are sought to be carried out by autonomous self-driving assemblies. Namely, an autonomous self-driving assembly faced with such a diverse confined region 201 may need to both drive and perform applications in two different types of spaces (e.g. wide 200 and narrow 225, 250). When it comes to advancing or driving, it may be that utilizing a narrow assembly 100 such as that illustrated would be sufficient for either type of space 200, 225 (or 250). That is, as long as the assembly 100 is of a profile that allows movement through a narrow passage 225 or window 250, it may inherently also be of a profile that allows movement within the larger wide space 200. Indeed, such is the case with the depicted assembly.

However, the same may not necessarily be the case when it comes to performing an application in either type of space 200, 225 (or 250). That is, an application that presents a measurable load to the assembly 100 may be less of a challenge for an assembly in a narrow passage 225. This is because the passage 225 itself may be utilized for bracing the assembly as the assembly facilitates the carrying out of the load-based application. For example, certain self-driving assemblies utilize rollers, treads, or other types of conveyances that contact opposing passage wall locations in carrying out the movement of the assembly in the first place. Thus, without much added reconfiguring, these types of assemblies may also be braced for carrying out the application at hand.

Assemblies such as the illustrated autonomous rail and tread self-driving and anchoring assembly 100 are able to move through narrow spaces 225, 250 and wider spaces 200 due to the narrow profile. Once more, through techniques described below, the assembly 100 is also able to brace in such locations for carrying out a load-based application. However, the assembly 100 is further able to brace or anchor in place within a wider space 200 for carrying out such applications. This is in part due to the fact that the advancement or driving of the assembly 100 does not require contact with multiple opposing surfaces that define spaces. Such may be possible in a narrow passageway 225 but not in a wider space 200. This means that upon reaching the wider space 200, the assembly 100 may be driven into position for an application (e.g. by way of roller 130, 135 and tread 140, 145 supported units 120, 125). Furthermore, as described below, the units 120, 125 and even the linear rail 150 may cooperatively extend as needed in a jack-like fashion to stabilize the assembly 100 for the carrying out of such applications within such wider spaces 200.

Figure 4:
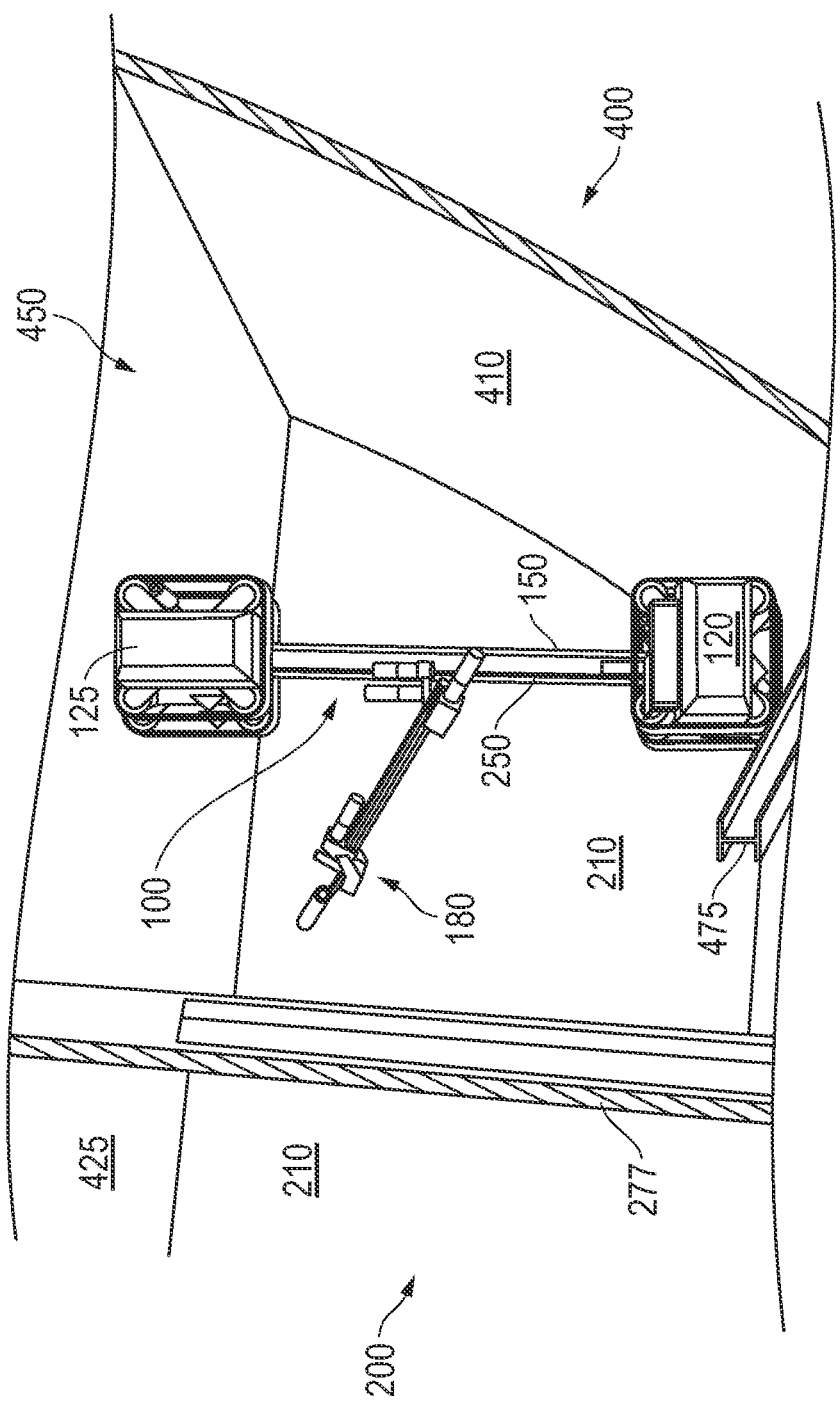
FIG. 4 is a side perspective view of the assembly of FIG. 3 anchored within another wide space in another confined region adjacent area.

Continuing with reference to FIG. 2A, the wide space 200 depicted includes sidewalls 210 that may be anywhere from 2-10 feet apart, a floor 230 and a backwall 277. The distance between the floor 230 and a ceiling 425 shown in FIG. 4 may be similar to that between the sidewalls 210. Once more, obstacles such as stairs 260 may be present as well as another vertical passage 275 leading to an adjacent wide space 450 as shown in FIG. 4. Of course, this is just an exemplary wide space 200 and overall confined region 201. Any number of different types of confined region 201 architectures may be presented that include both wide 200 and narrow 225, 250 spaces. In one embodiment, the confined region 201 may be defined as having at least one smaller volume, referred to herein as a "narrow space". This smaller volume may have a cross section with two surfaces spaced less than about two feet apart, or in the event of a non-polygonal cross section, two parallel tangential planes that are less than about two feet apart. Such a smaller volume narrow space may open into another portion of the confined region, the larger volume or "wide space" as it may be referenced herein. This larger volume includes two surfaces spaced apart by a distance of between about two and ten feet. Further, this larger volume wide space may include obstructions or other features such as baffles, braces or structural members that the self-driving assembly 100 may be prone to encounter. Examples of such are illustrated herein.

For such confined regions 201 as described above, the illustrated assembly 100 may be well suited to reach locations that are not readily or safely accessible in a direct manual manner. Once more, the assembly 100 is also brace-able or anchorable to stably support an application of some measurable load as described further below.

With added reference to FIG. 4, the example confined region 201 of FIG. 2A is a ship hull 400. It is not uncommon for such areas 201 to include wide 200, 450 and narrow spaces 225, 250 (e.g. under about 2 feet in diameter). In the illustration of FIG. 4, one wide space 200 is shown next to an adjacent wide space 450 with the vertical passage 275 between the two. The slender profile of the assembly 100 allows for it to reach the interior of either wide space 200, 450 for an application therein. Stability during movement is provided by the tread units 120, 125 being distanced apart and having some degree of elongation. In the embodiment shown, the tread units 120, 125 may present with treads 140, 145 interfacing between about 6 and 18 inches of the floor 230, depending on orientation thereto.

Figure 2B:
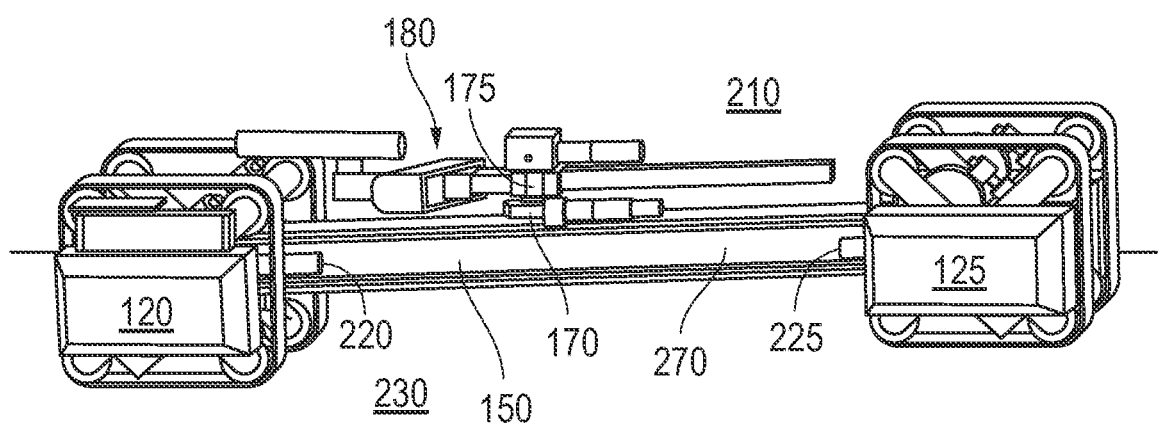
FIG. 2B is a side perspective view of the assembly of FIG. 2A within the wide space of the confined region.

Referring now to FIG. 2B, a side perspective view of the assembly 100 of FIG. 2A is shown within the wide space 200 of the confined region 201. In this view, the assembly 100 may be thought of as advancing along the floor 230 toward the stairs 260 of FIG. 2A. From this mostly side view perspective, the rail 150 can be seen with a recess guide 270 which interfaces the units 120, 125 and the tool base 170. Thus, depending on the state of affairs, the position of these components 120, 125, 170 along the rail 150 may be guidingly adjusted. In the embodiment shown, the tool 180 itself is kept aligned parallel with the rail 150 by the nature of the pivot 174 with the base 170 roughly centrally located along the rail 150. Further, the units 120, 125 are stably kept near the ends of the rail 150. Note the locking jack devices 220, 230 of each unit 120, 125 which may help in this regard. These may be the preferred locations for these features when the assembly 100 is in a driving state, particularly along a flat surface such as the depicted floor 230.

With the units 120, 125 parallel to the floor 230, the assembly 100 may navigate similar to a conventional autonomous, self-driving tracked assembly. However, as discussed below, conditions may dictate adjustment to these feature positions. The recess guide 270 may stably aid in this regard.

Figure 3:
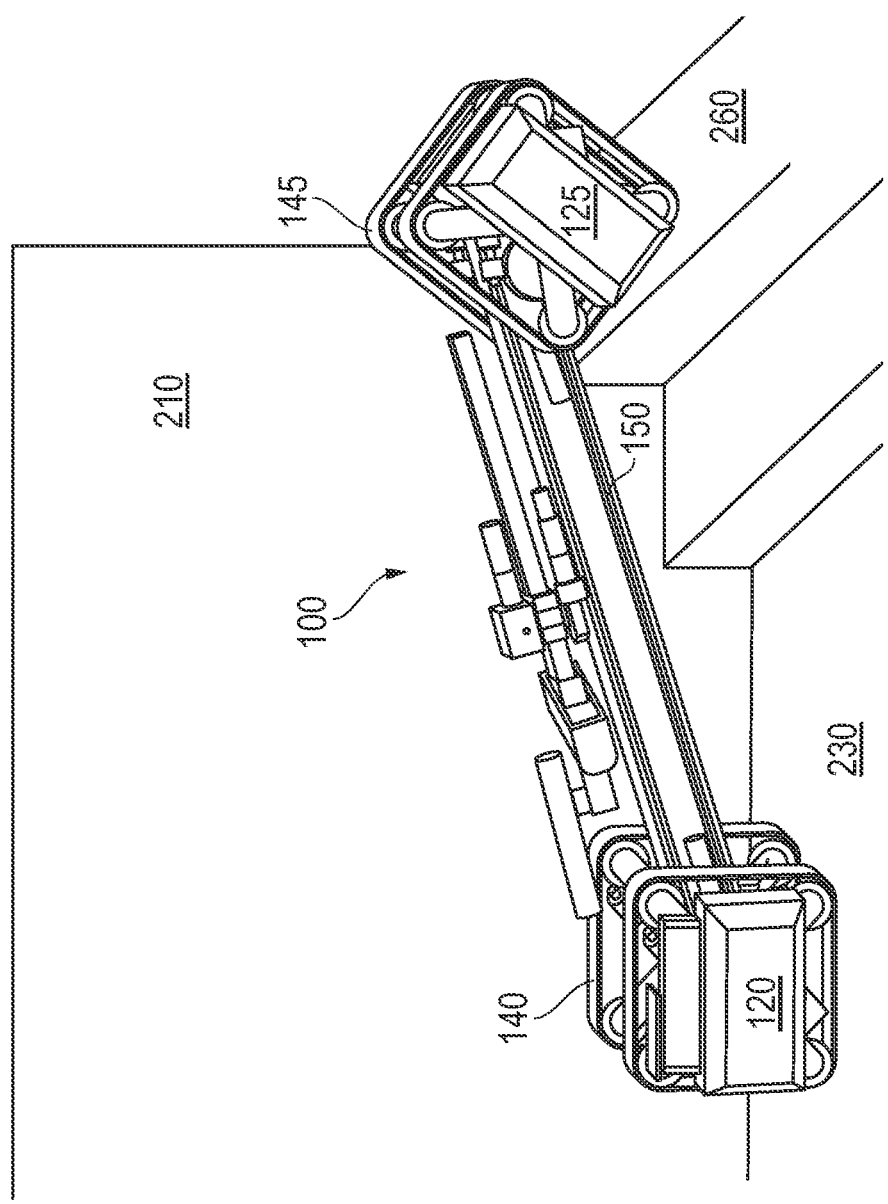
FIG. 3 is a side perspective view of the assembly of FIG. 2B traversing a raised obstacle of the wide space.

Referring now to FIG. 3, a side perspective view of the assembly 100 of FIG. 2B is shown traversing a raised obstacle 260 of the wide space 200. Specifically, as the assembly 100 moves along the floor 230, it is shown encountering the stairs noted above. As illustrated, the tread units 120, 125 are in pivotal relationship with the rail 150. Thus, as one unit 125 encounters the stairs 260, it may track upward, raising the rail 150 to an incline and angling the relationship or pitch between the rail 150 and each unit 120, 125. In one embodiment, the treads 140, 145 are equipped with a gripping enhancement as an aid to traversing an obstacle such as the depicted stairs 260. For example, magnetic or suction features may be employed to aid in climbing stairs 260 or even up a wall 210. That is, the treads 140, 145 define multiple sides of the units 120, 125 such that it is not just the bottom surface portion of treads 140, 145 which move the assembly 100 along a floor 230. Rather a front or toe portion of the treads 140, 145 may interface a wall 210 for advancement as noted. In certain circumstances even the top surface of the treads 140, 145 might interface a surface to further assembly advancement.

Referring now to FIG. 4, a side perspective view of the assembly 100 of FIG. 3 is shown braced or anchored within another wide space 450. In keeping with the example above, this adjacent wide space 450 shares a ceiling 425 with the initial wide space 200. So, for example, upon traversing the stairs 260 and the vertical passage 275 of FIGS. 2A and 2B, the assembly 100 may reach the adjacent wide space 450 to perform an application therein.

In the embodiment shown, the application at hand is a power washing application to be directed at the wall 210 which is also shared with the initial wide space 200. The application may subject the assembly 100 to a force of up to 100 lbs, though likely only about 25 lbs. may result. In one embodiment, the assembly 100 reaches the depicted location pulling a fluid line from a location external to the confined region of the ship 400. Thus, the tool 180 is provided with a supply of pressure washing fluid for the application.

Of course, bracing the assembly 100 for the application allows for it to take place in a stable manner. As illustrated, the assembly 100 traverses a beam obstacle 475 in the space 450 and potentially climbs a back wall 410, reaching the ceiling 425 and wedges itself bracingly in place. Recall that each tread unit 120, 125 may rotate or pivot relative the rail 150. Further, each unit 120, 125 may extend or contract to some degree relative the rail 150 along the recess guide 270 in a jack-like fashion. Indeed, in the embodiment shown, the ideal wedged position for the application shows one unit 120 rotated or pivoted to a perpendicular position relative the rail 150 with each unit 120, 125 jacked to a stable engagement with respective surfaces (e.g. the ceiling 425 and the obstacle 475/backwall 410).

With the assembly 100 now in a stable braced position, the tool 180 may extend and the application initiated. Once more, the tool 180 may move up and down along its engagement with the rail 150 as noted above. It may change the illustrated angle of deflection as desired. In one embodiment the rail 150 may even rotate, for example, re-aiming the tool 180 toward the backwall 410. All the while, the assembly 100 may remain firmly braced to facilitate the application. Stated another way, with the assembly 100 in an anchored state within the wide space 200, the rail 150 is rotatable about an axis that is parallel to a brace and normal force of the assembly 100.

Of course, any number of applications may be carried out in this manner by such an assembly 100. Milling or drilling, media blasting, cleaning, painting, backfilling or any number of other applications that might be considered "load-based" may be carried out by such an assembly 100. As used herein, the term "load-based" is not meant to infer any particular amount of load or force but rather to highlight the fact that the application presents some non-negligible amount of load on the assembly 100, unlike a visual inspection or data sensor-type application, for example. Although, such passive, inspection-type applications may also be carried out by the assembly 100. Once more, the types of confined regions are not limited to ships or even man-made structures. For example, the assembly 100 may be used to address issues within large wind turbines, nuclear facilities, liquid transport carriers, manmade facilities in war zones or even natural cavernous areas.

The assembly 100 utilized may be selected based on the particular confined region and the type of application to be run. For example, the assembly 100 may be up to about 10 feet in length and capable of hydraulically locking or bracing as illustrated in FIG. 4 with about 1,000 lbs. of force. However, where appropriate, the assembly 100 may be shorter and the degree of force increased, for example to support a higher load application.

Figure 5:
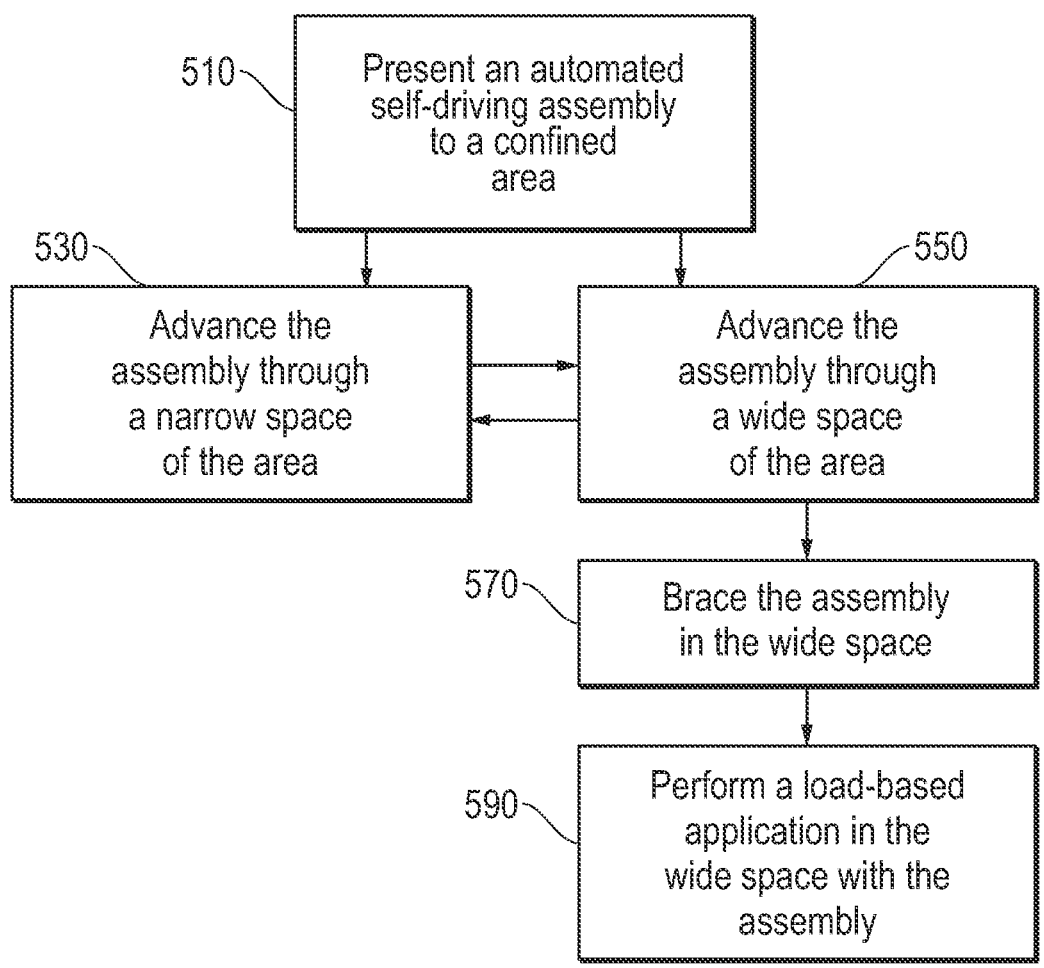
FIG. 5 is a flow-chart summarizing an embodiment of utilizing an autonomous rail and tread, self-driving and anchoring assembly to perform a load-based application in a confined region.

Referring now to FIG. 5, a flow-chart summarizing an embodiment of utilizing an autonomous rail and tread self-driving and anchoring assembly to perform a load-based application in a confined region is illustrated. As indicated at 510, the challenge of a confined region is presented to an automated self-driving assembly. The assembly is configured for advancement through narrow spaces 530 and wide spaces 550. The assembly is also uniquely configured for bracing within such wide spaces 550 to support a load-based application therein 590.

Embodiments described above provide self-driving autonomous assemblies that are able to navigate narrow passageways and large rooms alike within a confined region. The assemblies further avoid issues common with conventional narrow self-driving autonomous assemblies in that for embodiments herein, bracing of the assembly, even within large room spaces, is rendered practical. Thus, load-based applications may be carried out by the assemblies therein as indicated above.

The preceding description has been presented with reference to presently preferred embodiments. Persons skilled in the art and technology to which these embodiments pertain will appreciate that alterations and changes in the described structures and methods of operation may be practiced without meaningfully departing from the principle and scope of these embodiments. Furthermore, the foregoing description should not be read as pertaining only to the precise structures described and shown in the accompanying drawings, but rather should be read as consistent with and as support for the following claims, which are to have their fullest and fairest scope.

We claim:

1. An autonomous self-driving and anchoring assembly comprising:
   a linear rail to accommodate a load-based application tool;
   a first tread unit coupled to the rail to effect assembly advancement and to support movement of the assembly within a confined area;
   a second tread unit in axial alignment with the first tread unit and coupled to the rail to effect the advancement and to support movement of the assembly within the confined area, the confined area including space within and outside of a narrow passageway, the first and second tread units for cooperatively stabilizing the assembly for a load-based application with the load-based application tool.

2. The autonomous self-driving and anchoring assembly of claim 1 wherein the assembly is under two feet in height and width.

3. The autonomous self-driving and anchoring assembly of claim 1 wherein the load-based application tool is coupled to a base, the base slidable in position along the rail.

4. The autonomous self-driving and anchoring assembly of claim 3 wherein the load-based application tool is pivotable about a perpendicular axis through the base.

5. The autonomous self-driving and anchoring assembly of claim 1 wherein the rail is rotatable about an axis parallel to a brace and normal force displayed by the assembly when in an anchored state outside of the narrow passageway.

6. The autonomous self-driving and anchoring assembly of claim 1 wherein at least one of the tread units is slidable along the rail.

7. The autonomous self-driving and anchoring assembly of claim 1 wherein the first and second tread units comprise treads with multiple sides, each side equipped for interfacing a surface defining the confined area for achieving the movement.

8. The autonomous self-driving and anchoring assembly of claim 7 wherein the treads accommodate gripping enhancements at an outer surface thereof.

9. An arrangement comprising:
   a confined area with at least one narrow space of under two feet in diameter and at least one wide space having sidewalls of between two feet and seven feet apart; and
   an autonomous self-driving assembly with an elongated rail accommodating at least two tread units in axial alignment with one another to facilitate movement within each of the spaces and bracing within the wide space.

10. The arrangement of claim 9 wherein the assembly further comprises an application tool to facilitate an application in the wide space during the bracing.

11. The arrangement of claim 9 wherein the narrow space is one of a narrow window and a narrow passage.

12. The arrangement of claim 11 wherein the wide space is a first chamber connected to a second chamber by one of the window and the passage.

13. The arrangement of claim 9 wherein the confined area is a manmade confined area selected from a group consisting of a ship hull, a liquid transport carrier and a wind turbine.

* * * * *